US011905903B2

(12) United States Patent
Raseen et al.

(10) Patent No.: US 11,905,903 B2
(45) Date of Patent: Feb. 20, 2024

(54) PORT HEATING SYSTEM AND METHOD

(71) Applicant: Powerhouse Engine Solutions Switzerland IP Holding GmbH, Zug (CH)

(72) Inventors: Mohammed Raseen, Punalur (IN); Christopher Simoson, North East, PA (US); Matthew Hart, Erie, PA (US); Jason Lymangrover, Harborcreek, PA (US)

(73) Assignee: POWERHOUSE ENGINE SOLUTIONS SWITZERLAND IP HOLDING GMBH, Zug (CH)

( * ) Notice: Subject to any disclaimer, the term of this patent is extended or adjusted under 35 U.S.C. 154(b) by 25 days.

(21) Appl. No.: 17/382,695

(22) Filed: Jul. 22, 2021

(65) Prior Publication Data

US 2022/0025828 A1 Jan. 27, 2022

(30) Foreign Application Priority Data

Jul. 24, 2020 (IN) ............................ 202041031788

(51) Int. Cl.
*F02D 41/06* (2006.01)
*B61C 17/00* (2006.01)
(Continued)

(52) U.S. Cl.
CPC ............ *F02D 41/068* (2013.01); *B61C 17/00* (2013.01); *F02D 41/008* (2013.01);
(Continued)

(58) Field of Classification Search
CPC .. F02D 41/008; F02D 41/0082; F02D 41/068; F02D 2200/10; F01N 2900/1404
See application file for complete search history.

(56) References Cited

U.S. PATENT DOCUMENTS 3,295,506 A * 1/1967 Wisniowski .......... F02F 1/4214 123/279
7,128,052 B1 * 10/2006 Reed .................. F02D 41/0002 123/90.15

(Continued)

FOREIGN PATENT DOCUMENTS

EP 2933452 A2 10/2015
JP S57108449 A 7/1982

(Continued)

OTHER PUBLICATIONS

Eurasian Patent Office, Search Report Issued in Application No. 202092385, dated Nov. 30, 2021, 5 pages.

*Primary Examiner* — John M Zaleskas
(74) *Attorney, Agent, or Firm* — McCoy Russell LLP

(57) ABSTRACT

Methods and systems are provided for operating an engine having a plurality of cylinders that utilize oil for lubrication purposes. In one embodiment, a method for the engine may include determining if one or more conditions have been met for port heating based on one or more operating conditions of the engine, continuing current operation if the one or more conditions for port heating have not been met, and determining a souping level of the engine if the one or more conditions for port heating have been met and subsequently running port heating on a set of cylinders of the engine based on the souping level of the engine and/or the one or more conditions for port heating. The engine may be a non-EGR engine and/or a high speed diesel engine. Each cylinder of the set of cylinders may have at least one port.

19 Claims, 6 Drawing Sheets

(51) Int. Cl.
*F02D 41/00* (2006.01)
*F02D 41/04* (2006.01)

(52) U.S. Cl.
CPC ......... *F02D 41/0082* (2013.01); *F02D 41/04* (2013.01); *F02D 2200/10* (2013.01)

(56) References Cited

U.S. PATENT DOCUMENTS

| | | | | | |
|---|---|---|---|---|---|
| 7,953,541 | B2 | 5/2011 | Roth et al. | | |
| 8,831,858 | B2 | 9/2014 | Roth et al. | | |
| 2006/0080951 | A1 * | 4/2006 | Pott | F01N 3/0814 | 60/276 |
| 2010/0030448 | A1 * | 2/2010 | Roth | F02D 41/008 | 701/103 |
| 2011/0253113 | A1 * | 10/2011 | Roth | F02D 41/008 | 123/568.12 |
| 2012/0089278 | A1 * | 4/2012 | Goes | F02D 41/0025 | 701/19 |
| 2012/0323465 | A1 * | 12/2012 | Peters | F02M 26/43 | 701/104 |
| 2012/0323470 | A1 * | 12/2012 | Klingbeil | F02D 41/405 | 701/108 |
| 2013/0030672 | A1 * | 1/2013 | Klingbeil | F02D 41/0052 | 701/109 |
| 2013/0092124 | A1 * | 4/2013 | Lorenz | F02D 41/008 | 123/305 |
| 2013/0283766 | A1 * | 10/2013 | Primus | F02M 26/47 | 60/272 |
| 2015/0114341 | A1 * | 4/2015 | Geckler | F02D 41/0087 | 123/295 |
| 2016/0186672 | A1 * | 6/2016 | Mehrotra | F01N 3/2006 | 60/274 |
| 2016/0208744 | A1 * | 7/2016 | Bailey | F01P 7/16 | |
| 2017/0152781 | A1 * | 6/2017 | Free | F01N 9/00 | |
| 2017/0152815 | A1 * | 6/2017 | Peters | F01P 7/16 | |
| 2017/0284318 | A1 * | 10/2017 | Klingbeil | F02D 41/08 | |
| 2018/0216556 | A1 * | 8/2018 | Omura | F02D 13/0234 | |
| 2018/0230929 | A1 * | 8/2018 | Kitazume | F02D 41/047 | |
| 2019/0345858 | A1 * | 11/2019 | Zielinski | F02D 41/1474 | |
| 2020/0095912 | A1 * | 3/2020 | Bouws | F01N 3/025 | |
| 2021/0062741 | A1 * | 3/2021 | Puntambekar | F02P 5/1512 | |
| 2021/0310435 | A1 * | 10/2021 | Thomas | F02D 41/38 | |
| 2022/0010741 | A1 * | 1/2022 | Tharakan | F02D 41/182 | |
| 2022/0018298 | A1 * | 1/2022 | Leone | F02D 41/1474 | |

FOREIGN PATENT DOCUMENTS

| | | | |
|---|---|---|---|
| JP | S57210155 | A | 12/1982 |
| JP | 2018096368 | A * | 6/2018 |
| JP | 2018096368 | A | 6/2018 |
| SU | 979672 | A1 | 12/1982 |
| WO | 2013001311 | A1 | 1/2013 |
| WO | 2018200623 | A1 | 11/2018 |
| WO | 2020205073 | A1 | 10/2020 |

* cited by examiner

PORT HEATING SYSTEM AND METHOD

CROSS REFERENCE TO RELATED APPLICATIONS

The present application claims priority to Indian Patent Application No. 202041031788, entitled "PORT HEATING SYSTEM AND METHOD," and filed on Jul. 24, 2020. The entire contents of the above-listed application are hereby incorporated by reference for all purposes.

BACKGROUND

Technical Field

Embodiments of the subject matter disclosed herein relate to internal combustion engines and, more specifically, to heating cylinder exhaust ports.

Discussion of Art

Various engines may have lubrication systems in which pressurized oil can be used to lubricate and/or cool engine valve train components, camshaft assemblies, pistons, and related engine components. Such oil systems may supply sufficient oil for both lubrication and cooling of such engines at full load.

In some engines, such as large bore engines designed for significant (e.g., higher performance) operation under full (e.g., rated) load, oil from the lubrication system may be retained in the grooves of a cylinder wall and may eventually enter an exhaust system or engine stack. More specifically, unburned fuel from combustion during low load conditions may contribute to accumulation and deposition of the unburned fuel and oil in the exhaust system, especially at reduced exhaust port temperatures.

One approach to address such deposits involves regular (e.g., periodic) exhaust system maintenance. In one example, exhaust stack maintenance may entail service personnel climbing onto a top surface of a locomotive and manually cleaning the exhaust system. However, frequent exhaust system maintenance compounded with the use of complicated manual maneuvers therein may introduce unwanted delays in engine operation. Another approach involves, during an exhaust gas recirculation (EGR) cooler heating mode, operating at least one donor cylinder at a cylinder load sufficient to increase an exhaust temperature to a level where local oil and fuel accumulation may be burned off. However, this approach demands the use of an EGR system and fails to account for engine age or engine souping (e.g., fouling) during long idling periods. Thus, there is a fuel consumption penalty associated with this method. It may be desirable to have a system and method that differ from those that are currently available.

BRIEF DESCRIPTION

In one embodiment, a method for an engine may include determining one or more operating conditions of the engine, determining a load of the engine, determining if one or more conditions have been met for port heating based on the one or more operating conditions of the engine and the load of the engine, continuing current operation if the one or more conditions for port heating have not been met, and determining a souping level of the engine if the one or more conditions for port heating have been met and subsequently running port heating on a set of cylinders of the engine based on the souping level of the engine and/or the one or more conditions for port heating. The engine may be a non-exhaust gas recirculation engine and/or a high speed diesel engine. Each cylinder of the set of cylinders may have at least one port.

In one embodiment, a system may include a high speed diesel engine having cylinders in banks, each cylinder having at least one port, and a controller that is configured to operate the engine in at least two modes, with at least one of the at least two modes being a port heating mode. The controller may further be configured to decrease, for the port heating mode, one or more of a frequency of port heating events and a duration of each port heating event as an age of the engine increases.

In one embodiment, a system may include a high speed diesel engine having cylinders in banks, each cylinder having at least one port, and a controller. The controller may be configured to operate the engine in at least two modes, with at least one of the at least two modes being a port heating mode. The controller may further be configured to reduce a fuel consumption penalty of the port heating mode by decreasing an operating aspect of the port heating mode based at least in part on a calculated or measured level of souping of the engine.

DETAILED DESCRIPTION

Figure 1:
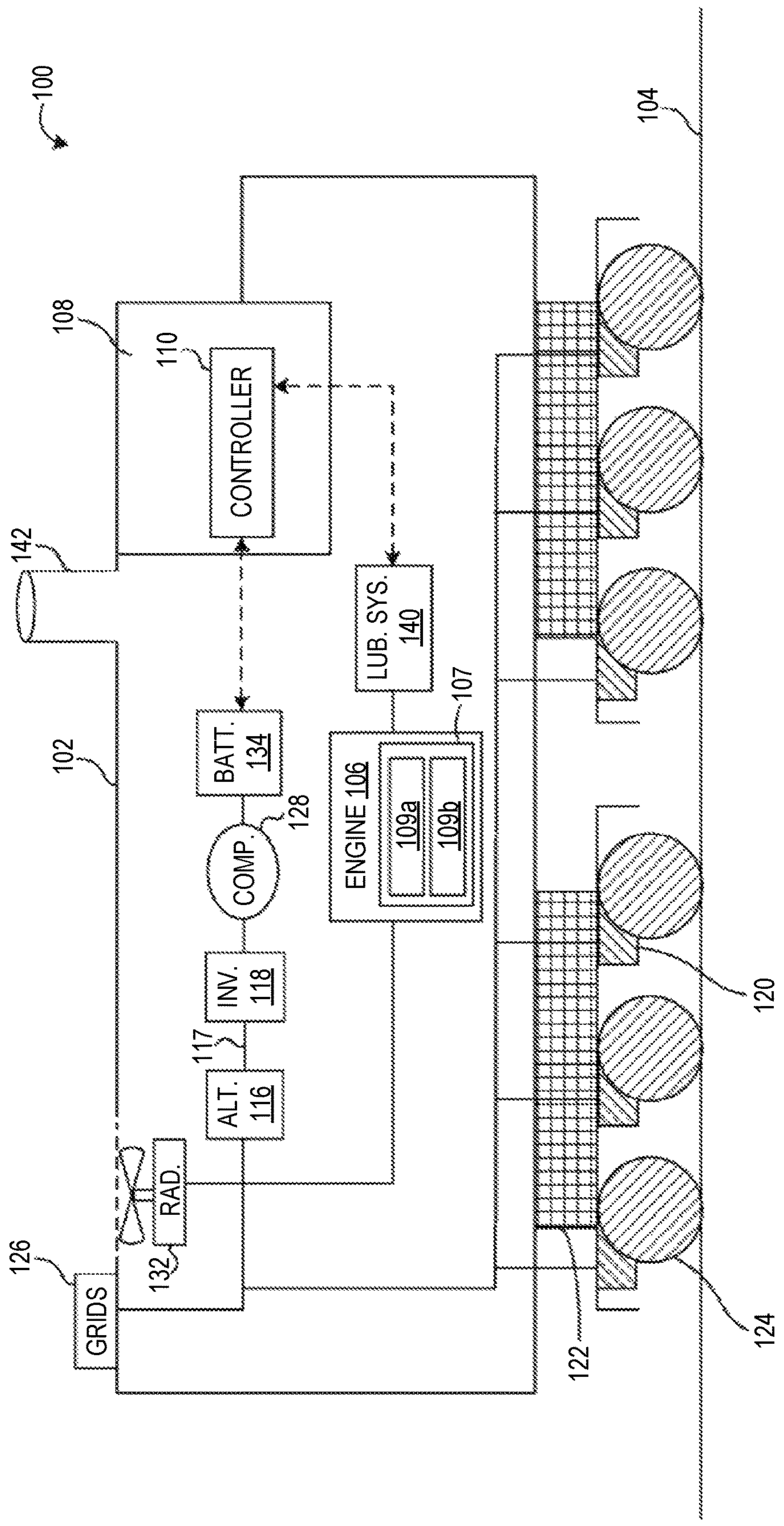
FIG. 1 shows an example embodiment of a diesel-electric locomotive.

The following description relates to a system and method for port heating in engines. Such engines may have lubrication systems that provide oil for lubricating valve trains, pistons, and other related engine components. Unburned oil and/or fuel may accumulate in an engine exhaust manifold during the course of engine operation. Accordingly, exemplary embodiments of such a lubricating system may interact with a corresponding engine, as controlled by an engine control system, to burn off otherwise unburned oil and/or fuel and thereby reduce fouling of an exhaust system of the engine. One example of such a configuration is illustrated with reference to FIG. 1, in which a lubricating system may interact with a locomotive engine to provide lubrication during engine operation and an engine controller may enable regular (e.g., periodic) exhaust maintenance.

In one embodiment, an engine controller may switch an engine between different operating modes. Examples of operating modes may include normal running mode, low load, high load, high heat mode, startup mode, restricted oxygen mode, and the like. Under normal running conditions, oil used to lubricate a piston can carry over into a combustion chamber and work its way into an exhaust system. During extended periods of low load operation, exhaust temperatures may not be high enough to burn off this oil carry-over. Carry-over, souping (e.g., fouling), and/or excessive soot generation may result in wet oil or soot from within the exhaust system being deposited near the engine, such as on the exterior of a vehicle housing the engine and/or back into an air intake system via EGR (where applicable). In one embodiment, a technical effect may include using port heating to mitigate oil carry-over. Port heating may be accomplished by, for example, over-fueling one or more cylinders to increase exhaust temperatures and locally burn off any oil accumulation before it can travel downstream of corresponding cylinder exhaust port(s). As further elaborated in FIGS. 2-4, control routines may be performed to initiate port heating without EGR cooler regeneration, where the port heating is graduated out over time and heating is weighted by engine age/souping level (in contrast with current methods). In this way, a fuel penalty associated with cylinder port heating may be minimized, taking advantage of a reduction in souping over time as the engine breaks in.

In one embodiment, a system may include a high speed diesel engine having cylinders in banks, each cylinder having at least one port, and a controller that can operate the engine in at least two modes, with at least one of the at least two modes being a port heating mode. The controller may switch to the port heating mode based on one or more triggers. Suitable triggers may include one or more of a function of time and an age of the engine, wherewith the port heating mode may be varied by decreasing one or more of a frequency of port heating events, a duration of each port heating event, a target temperature of each port heating event, and an amount of fuel used by at least one of the cylinders during each port heating event. For example, one or more of the frequency of port heating events and the duration of each port heating event may be decreased based on the age of the engine. In some examples, the age of the engine may be a measured or calculated megawatt-hours (MWh) of the engine. A high speed diesel engine may have its highest power output of approximately 5 MW. As non-limiting examples, the high speed engine may be used to power vehicles, trucks, buses, cars, yachts, shipping vessels, compressors, pumps, and/or generators.

Figure 5:
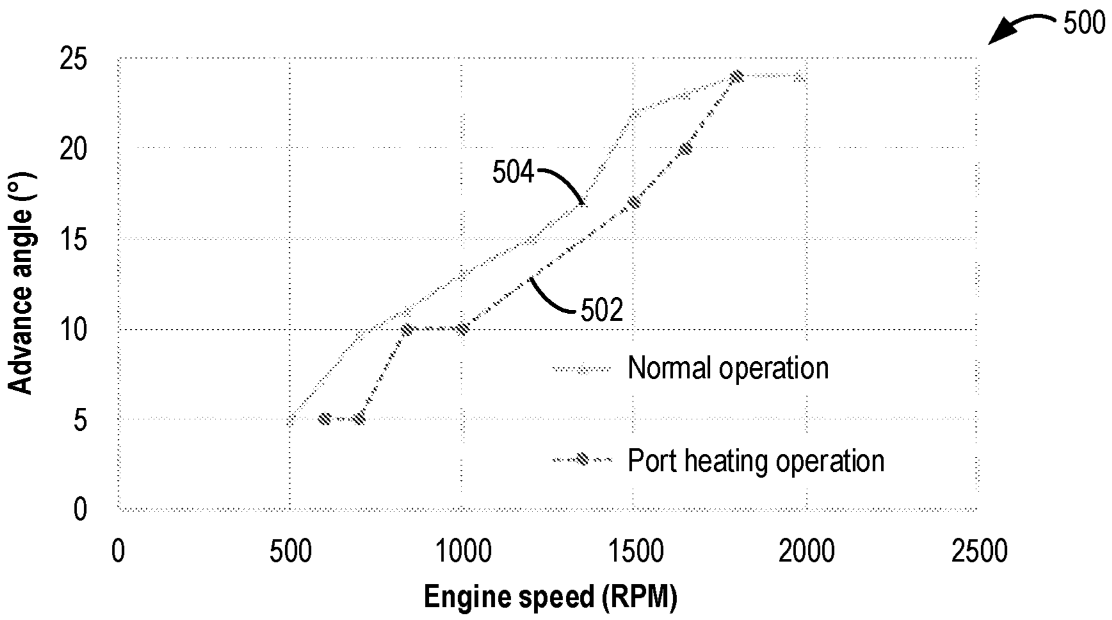
FIG. 5 shows a non-limiting example of graphical data illustrating a timing advance angle during port heating using the routines presented in FIGS. 3 and 4 as compared to a timing advance angle during normal engine operation.
Figure 6:
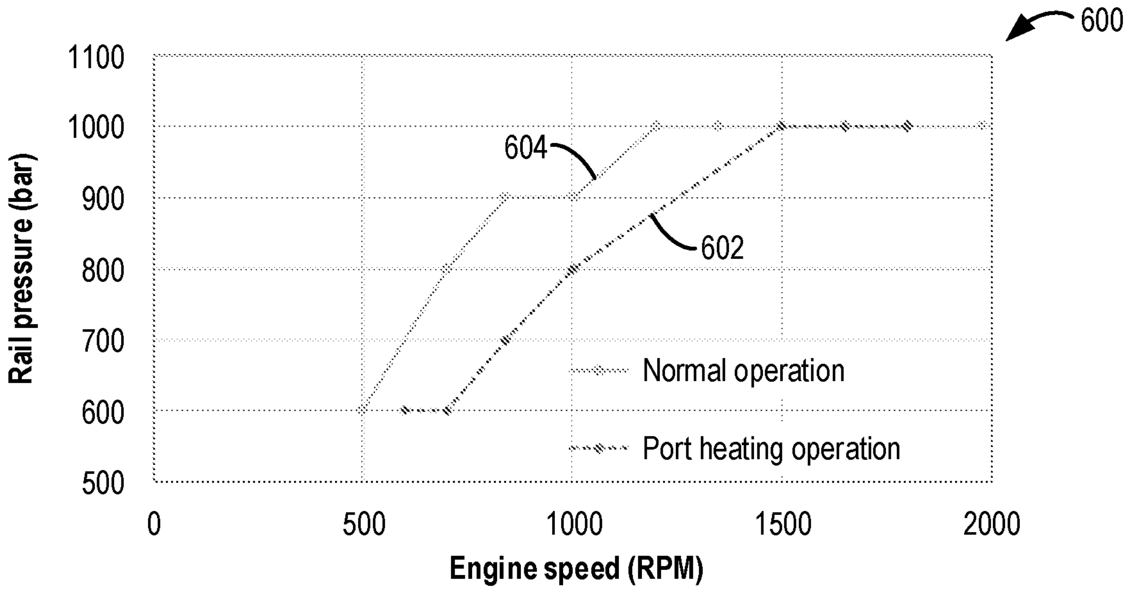
FIG. 6 shows a non-limiting example of graphical data illustrating a rail pressure during port heating using the routines presented in FIGS. 3 and 4 as compared to a rail pressure during normal engine operation.

In another embodiment, a system includes a high speed diesel engine having cylinders in banks, each cylinder having at least one port, and a controller. The controller may be configured to operate the engine in at least two modes, with at least one of the at least two modes being a port heating mode. The controller may further be configured to decrease an operating aspect of the port heating mode based at least in part on a calculated or measured level of souping of the engine. FIGS. 5 and 6 show example graphical representations of an advanced angle timing and a rail fuel pressure, respectively, during each of normal operation and port heating using the routine described with respect to FIGS. 3 and 4.

The approach described herein may be employed in a variety of engine types and sizes and speeds, and in a variety of engine-driven systems. Some of these systems may be stationary while others may be on semi-mobile or mobile platforms. Semi-mobile platforms may be relocated between operational periods, such as while mounted on flatbed trailers. Mobile platforms may include self-propelled vehicles. Such vehicles may include on-road transportation vehicles (e.g., automobiles), mining equipment, marine vessels, rail vehicles, and other off-highway vehicles (OHVs). A locomotive is provided as an example of a mobile platform supporting a system incorporating an embodiment of the disclosure. A suitable non-vehicle application may include a station power generator.

In one embodiment, a platform is disclosed for an engine disposed in a vehicle. FIG. 1 is a block diagram of an example vehicle system having a rail vehicle. In the illustrated embodiment, the rail vehicle is depicted as a locomotive 100 with a main engine housing 102 that can travel on a track 104. Further, the locomotive may be a diesel electric vehicle operating a diesel engine 106 that is located within the engine housing. In alternative embodiments, a suitable engine may consume or utilize various fuels and oils other than diesel fuel and lubricating oil. Suitable other fuels may include gasoline, kerosene, alcohol, natural gas, biodiesel, and mixtures of two or more thereof. The engine may include a plurality of cylinders 107. In one example, engine may include twelve cylinders (e.g., two banks of six cylinders each). Further, the plurality of cylinders in the engine may include various sets and subsets of cylinders, such as a first subset of cylinders 109*a* and a second subset of cylinders 109*b*. In some embodiments, each subset of cylinders may include one or more donor cylinders (e.g., dedicated to generating exhaust for an EGR operation) and one or more non-donor cylinders (e.g., one or more remaining cylinders which are not donor cylinders). In other embodiments, the first subset of cylinders may include only donor cylinders and the second subset of cylinders may include only non-donor cylinders, for example. The various sets and subsets of cylinders may include one or more cylinder groups for selected operating modes, as described herein. In alternate embodiments, alternate engine configurations may be employed, such as a gasoline engine or a biodiesel or natural gas engine, for example.

An operating crew and electronic components involved in vehicle systems control and management may be housed within a locomotive cab 108. In one example, a controller 110 may include a computer control system and/or an engine control system. The locomotive control system may have non-transitory computer readable storage media (not shown) including code for enabling an on-board monitoring and control of locomotive operation. The controller may oversee vehicle systems control and management and may receive signals from a variety of sources to estimate vehicle operating parameters. The controller may be linked to a display (not shown) to provide a user interface to the vehicle operating crew. In one embodiment, the controller may be configured to operate with an automatic engine start/stop (AESS) control system on an idle vehicle 100, thereby enabling the vehicle engine to be automatically started and stopped upon fulfillment of AESS criteria as managed by an AESS control routine.

The engine may be started with an engine starting system. In one example, a generator start may be performed wherein the electrical energy produced by a generator or alternator 116 may be used to start the engine. Alternatively, the engine starting system may use a motor to start the engine. Suitable motors may include an electric starter motor or a compressed air motor. The engine may be started using energy from an energy storage device, such as a battery, or other appropriate energy source.

The diesel engine generates a torque that is transmitted to the alternator along a drive shaft (not shown). The generated torque is used by the alternator to generate electricity for subsequent propagation (e.g., propulsion) of the vehicle. The electrical power generated in this manner may be referred to as the prime mover power. The electrical power may be transmitted along an electrical bus 117 to a variety of downstream electrical components. Based on the nature of the generated electrical output, the electrical bus may be a direct current (DC) bus (as depicted) or an alternating current (AC) bus. Various power electronics components may be used to manage the electrical current.

The engine may be operated under a plurality of load levels and/or a plurality of engine speeds. These load levels may range from idle on the low end to a peak engine output on the high end. Low engine load may include operation at a lower end of the engine load range. Mid-engine load may include operation at a mid-level of the engine load range above low load. High engine load may include operation at a higher end of the engine load range above mid-engine load. While the engine may operate at a given engine load, each cylinder may have a variable cylinder load. These cylinder loads may range from cylinder low-load to cylinder high-load. The engine load and the cylinder load(s) may coincide in some instances, while not in other instances. For example, the engine overall may be operated under low load, however, some cylinders may be operated at substantially no-load (e.g., deactivated), while other cylinders operate at a mid- to high-load, depending on the number of cylinders operating at the different loads. Further, a cylinder fuel injection amount may set a cylinder's load. For example, a cylinder operating without fuel injection may be considered deactivated (in which case it may be referred to as skip fire operation), while a cylinder operating with low fuel injection may be considered to be operating under low-load.

The alternator may be connected in series to power electronics having one or more rectifiers (not shown) that convert the alternator's electrical output to DC electrical power prior to transmission along the DC bus. Based on the configuration of a downstream electrical component receiving power from the electrical (e.g., DC) bus, one or more inverters 118 may be configured to invert the electrical power from the electrical bus prior to supplying electrical power to the downstream component. In one embodiment, a single inverter may supply AC electrical power from a DC electrical bus to a plurality of components. In an alternate embodiment, each of a plurality of distinct inverters may supply electrical power to a distinct component. For example, each distinct inverter may supply electrical power to a different, distinct component from each other distinct inverter. The vehicle may include one or more inverters connected to a switch that may be controlled to selectively provide electrical power to different components connected to the switch.

A traction motor 120, mounted on a truck 122 below the main engine housing, may receive electrical power from the alternator via the DC bus to provide traction power to propel the vehicle. As described herein, the traction motor may be an AC motor. Accordingly, an inverter paired with the traction motor may convert the DC input to an appropriate AC input, such as a three-phase AC input, for subsequent use by the traction motor. In alternate embodiments, the traction motor may be a DC motor directly employing the output of the alternator after rectification and transmission along the DC bus. One example vehicle configuration may include one inverter/traction motor pair per wheel-axle 124. As depicted herein, six pairs of inverter/traction motors are shown for each of six pairs of wheel-axle of the vehicle. For example, each inverter/traction motor pair may be associated with a different wheel-axle. In alternate embodiments, the vehicle may have four inverter/traction motor pairs. In alternative embodiments, a single inverter may be paired with a plurality of traction motors.

The traction motor may act as a generator providing dynamic braking to brake the vehicle. In particular, during dynamic braking, the traction motor may provide torque in a direction that is opposite from the rolling direction thereby generating electricity that is dissipated as heat by a grid of resistors 126 connected to the electrical bus. In one example, the grid may include stacks of resistive elements connected in series directly to the electrical bus. The stacks of resistive elements may be positioned proximate to the ceiling of the main engine housing in order to facilitate air cooling and heat dissipation from the grid. In some embodiments, air brakes (not shown) making use of compressed air may be used by the vehicle as part of a vehicle braking system. The compressed air may be generated from intake air by a compressor 128.

A multitude of motor driven airflow devices may be operated for temperature control of vehicle components. The airflow devices may include, but are not limited to, blowers, radiators, and fans. A variety of blowers (not shown) may be provided for forced-air cooling of various electrical components. For example, such blowers may include a traction motor blower to cool the traction motor during periods of heavy work, an alternator blower to cool the alternator, and a grid blower to cool the grid of resistors. Each blower may be driven by an AC or DC motor and accordingly may be configured to receive electrical power from the DC bus by way of a respective inverter.

Engine temperature may be maintained in part by a radiator 132. Water may be circulated around the engine to absorb excess heat and contain the engine temperature within a desired range for efficient engine operation. The heated water may then be passed through the radiator wherein air blown through a radiator fan may cool the heated water. The radiator fan may be located in a horizontal configuration proximate to a rear ceiling of the vehicle such that. upon blade rotation, air may be sucked from below and exhausted. A cooling system including a water-based coolant may optionally be used in conjunction with the radiator to provide additional cooling of the engine.

An on-board electrical energy storage device, represented by battery 134 in this example, may be linked to the DC bus. A DC-DC converter (not shown) may be disposed between the DC bus and the battery to allow a high voltage of the DC bus (for example, in the range of 1000 V) to be stepped down appropriately for use by the battery (for example, in the range of 12-75 V). In the case of a hybrid vehicle, the on-board electrical energy storage device may be in the form of high voltage batteries, such that placement of an intermediate DC-DC converter may not be necessitated. The battery may be charged by running the engine. The electrical energy stored in the battery may be used during a stand-by mode of engine operation, or when the engine is shut down, to operate various electronic components such as lights, on-board monitoring systems, microprocessors, processor displays, climate controls, and the like. The battery may be used to provide an initial charge to start-up the engine from a shut-down condition. In alternate embodiments, the on-board electrical energy storage device may be a super-capacitor, for example.

A lubrication system 140 may include a pressure fed oil system with a crank driven oil pump for lubricating the engine crankshaft, valves, and pistons. A reservoir of oil may be stored in a sump below the engine. The valves may be lubricated with splash oil while cylinder liners may be lubricated by pressurized oil being fed into the piston(s), off the crankshaft, for both cooling and lubricating purposes. Carry-over of oil into the combustion chamber (e.g., cylinder) may be controlled by piston rings. As such, the piston rings may be shaped to allow enough oil to reach a top piston ring and lubricate it when the cylinder is working at full load. Gas pressure balance in piston ring grooves may further control carry-over of oil into the combustion chamber. Oil may drain out below an oil control ring and, as the piston moves up and down the cylinder liner, the oil control ring may remove the majority of this oil by scraping. The remaining oil may be carried by remaining piston rings to provide them sufficient lubrication. If the oil gets heated during passage around the engine, it may be cooled by passage through the radiator. An exhaust stack 142 may receive exhaust gas from the engine and directs it away therefrom. Ducts or tubing (not shown) may be provided between the crankcase (holding the lubricating oil) and the exhaust stack for ventilating the crankcase, for example, for ventilating blow-by gas from the crankcase.

The lubrication system may supply sufficient oil for a full load operation. However, at light loads, an excess amount of oil may be supplied. For a given cylinder, some of the excess oil may be carried into the cylinder (e.g., combustion) chamber and corresponding exhaust port. Oil in the combustion chamber may originate from oil retained in grooves of cylinder liner walls. As such, the engine may retain some oil in the grooves to provide lubrication for the pistons and rings. Carry-over oil in the combustion chamber may also be contributed by oil lubricating the valves. Herein, oil moves down the valves to provide lubrication between the valve and a corresponding valve guide, and further at a seating surface of the valve on a cylinder head. In some instances, when the engine has accumulated a few hours of operation, an oil carry-over condition may be more severe and the condition may be exacerbated by the carry-over of excess lubrication oil into an associated turbocharger over a period of time. Thus, the controller communicating with the engine system may enable a port heating routine, as further elaborated in FIGS. 3 and 4, to allow any unburned oil to be burned off and avert degraded engine performance due to accumulation of the unburned oil. It will be appreciated that the routine may also allow unburned fuel as may have accumulated in the combustion chamber due to poor fuel combustion under low load conditions to be burned off. Alternatively, an engine may break in after some use, and before being worn out, so as to decrease a risk of souping. In such instances, the controller may reduce or eliminate the port heating routine. Various control algorithms may be employed based on, for example, measuring of an actual souping amount at various locations, indirect factors (such as soot production or exhaust opacity), or calculating based on engine age (e.g., MWh produced), duty cycle, etc.

Figure 2:
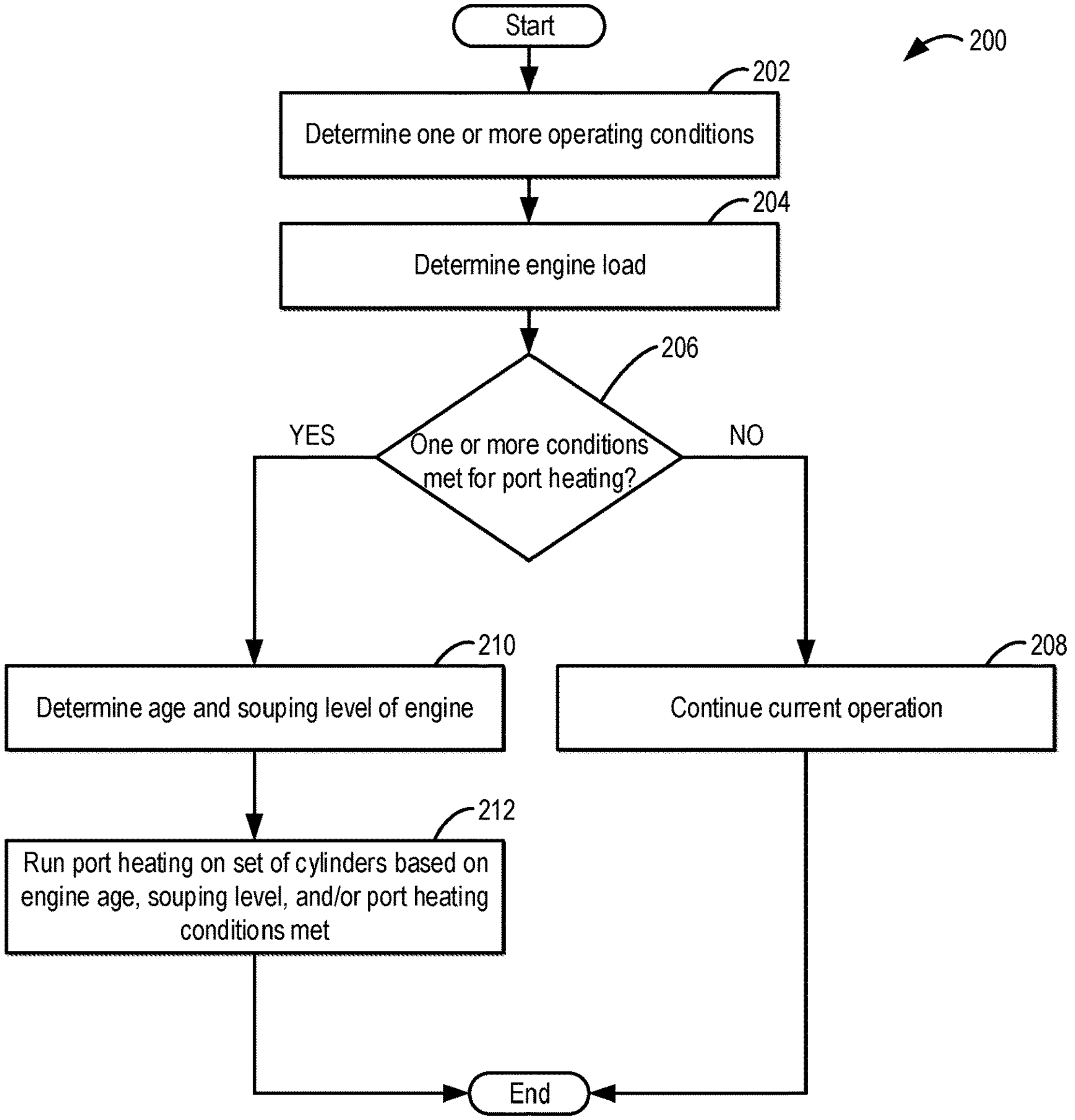
FIG. 2 shows a high level flow chart illustrating a method for an engine, according to an embodiment of the disclosure.

FIG. 2 depicts an example method 200 of determining if (e.g., under which conditions) a port heating mode of operation may be carried out within a non-EGR engine and/or a high speed internal combustion engine. The method may be performed by a control system, or a controller, in communication with an engine to enable exhaust port heating and subsequent burning of unburned oil and/or fuel. The control system may operate in at least two modes, with at least one of the at least two modes being a port heating mode. During engine operation, the controller may change an operating aspect of the port heating mode based at least in part on a calculated or measured level of souping of the engine and/or engine age.

At step 202, the method may include determining one or more engine operating conditions. The one or more engine operating conditions may include an engine idling condition, an idling time, an engine load, an engine loading time, an engine age, an engine speed, and the like. At step 204, the method may include determining the engine load (e.g., if not determined at step 202). As described above, the engine load may range from idle on a low end of an engine load range to peak engine output on a high end of the engine load range. At step 206, the method may include determining if conditions have been met for port heating. Conditions that may be met may include when the engine load is below a threshold load (e.g., low load), after the engine has experienced conditions that put the engine at risk for oil in the exhaust gas (e.g., after the engine has been at low load for a duration that may be a relatively extended period of time), when the engine is operating at idle, or during dynamic braking. During operation with the engine load below the threshold load, select cylinders may operate with a higher cylinder load (e.g., via the port heating mode) such that exhaust port temperatures are increased to remove deposits. In one non-limiting example, the cylinders operating with the higher cylinder load may correspond to ~99.9% torque production at a given engine speed. For instance, the higher cylinder load may correspond to 385 kW within a port heating engine speed range of 840 to 1800 rpm. Remaining cylinders may be operated with a lower cylinder load, the lower cylinder load less than the higher cylinder load. For instance, the lower cylinder load may correspond to less than 80 kW. Accordingly, the remaining cylinders may regulate the given engine speed (e.g., according to a value selected from the port heating engine speed range).

In another example, the controller may determine one or more of accumulated engine revolutions at low or no load, a load amount, and engine revolutions as a function of MWh as factor(s) in determining whether to initiate port heating. For example, the engine speed, the engine load, the engine age (e.g., in MWh), and/or time may be taken into account so that differential port heating is engaged at multiple speeds (e.g., different speed levels may trigger different levels of port heating). In one embodiment, one or more idle timer criteria may be used to determine if the condition(s) have been met for port heating. The idle timer may be based on different engine speeds [e.g., a first speed, a second speed, a third speed (high speed, medium speed, low speed), etc.] as well as different engine ages and normalized to an engine revolution count [e.g., by using a two-dimensional (2D) table of multipliers determined as a function of the engine speed and the engine age in MWh]. A normalized engine revolution counter limit may be used as a threshold counter to enable port heating. In one embodiment, the normalized engine revolution counter limit may be expressed as a one-dimensional (1D) vector (e.g., as a function of the engine age in MWh).

If conditions for port heating have not been met, the method may proceed to step 208, where the method may include continuing current engine operation. If conditions for port heating have been met, the method may proceed to step 210, where the method may include determining the engine age and a souping level of the engine (although, in some examples, the engine age may be determined at step 202 and only the souping level of the engine may be determined at step 210). During idling of diesel engines for extended periods of time, souping may occur where a significant fraction of engine emissions is not emitted but retained as "soup" (e.g., semi-volatile hydrocarbons and lubricating oil) to be subsequently emitted when the engine returns to higher-load operation. This soup may accumulate and form unwanted deposits downstream of cylinder exhaust ports. Accordingly, at step 212, the method may include running port heating on a set of cylinders (e.g., a portion or all of the cylinders in the engine) based on the engine age, the souping level, and/or the port heating conditions met. In one embodiment, the control system may operate in at least two modes, with at least one of the at least two modes being a port heating mode. During engine operation, the controller may change (e.g., decrease) one or more operating aspects of the port heating mode based on one or more factors (e.g., a function of time, the engine age in measured or calculated MWh of the engine, etc.), the one or more operating aspects including one or more of a frequency of port heating events, a duration of each port heating event, a target temperature of each port heating event, and an amount of fuel used during each port heating event. For example, the controller may decrease, for the port heating mode, one or more of the frequency of port heating events and the duration of each port heating event based on the engine age.

Figure 3:
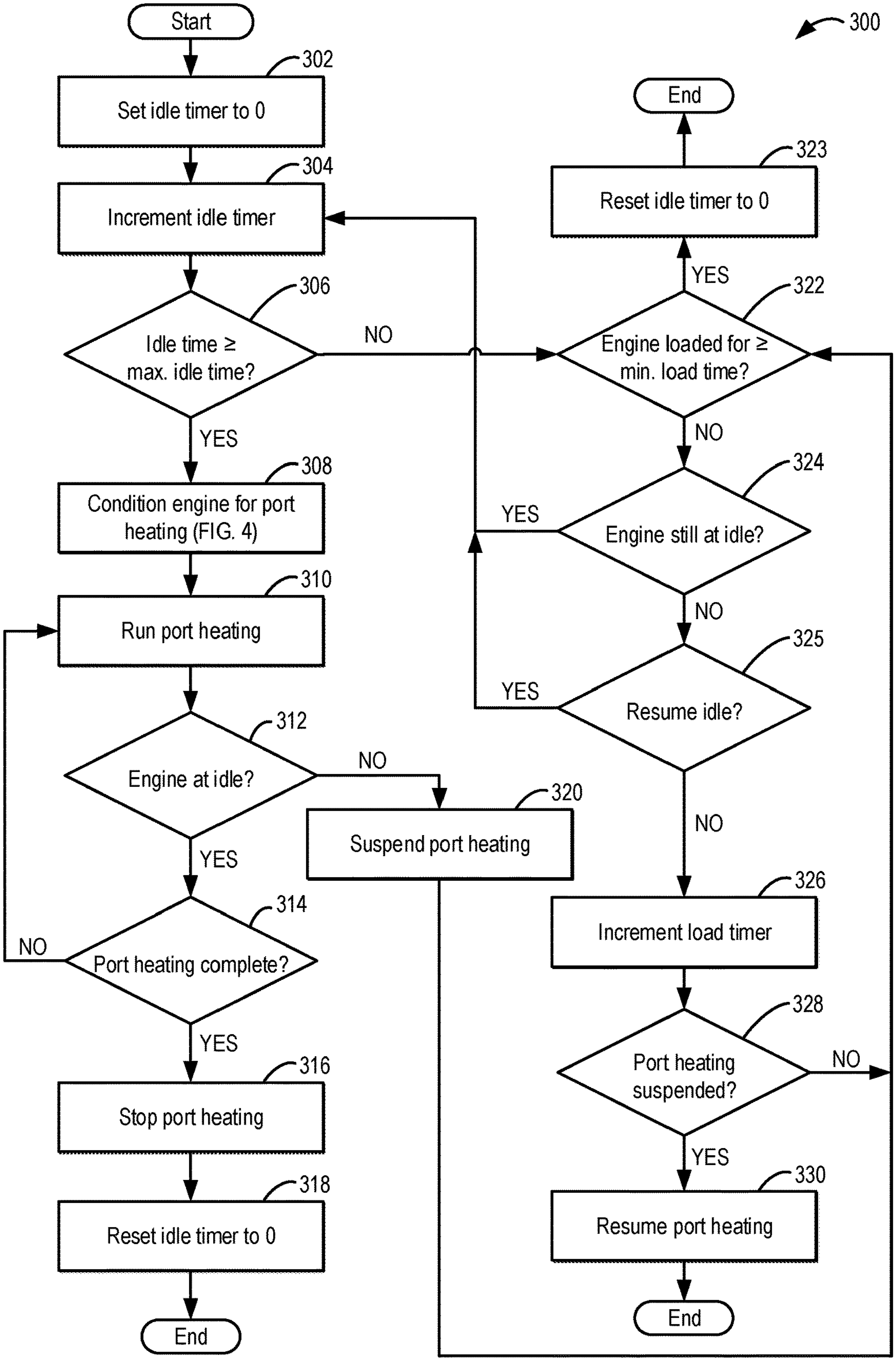
FIG. 3 shows a high level flow chart illustrating an example port heating routine for an engine, according to an embodiment of the disclosure.

FIG. 3 depicts an example routine 300 by executable a control system, such as a controller, in communication with an engine, such as a non-EGR engine and/or a high speed diesel engine, to enable exhaust port heating and subsequent burning of unburned oil and/or fuel. As such, the routine may be performed as part of, or may wholly substitute, the port heating step (step 212) of method 200, as described in detail above with reference to FIG. 2. As a non-limiting example, the routine may operate within a vehicle system for a rail vehicle (e.g., a locomotive). The operation may consider one or more engine operating conditions, such as an engine idling condition, an engine age, an engine speed, an idling time, an engine load, an engine loading time, and initiate a port heating operation based on the one or more engine operating conditions. The port heating operation may vary dependent on one or more of the engine age, a souping level of the engine, and the engine speed. In this way, as there is less demand for port heating as the engine breaks in, a fuel consumption penalty associated with port heating may be reduced over time. For example, variation in port heating may include decreasing the frequency and/or duration of port heating events over time and engine use (e.g., as the engine age increases), with differential port heating engaged in response to different thresholds or ratios being met [e.g., different speed, rail pressure (RP), or advanced angle (AA) ratios/ranges].

In one example, the port heating operation may include successively operating distinct subsets of cylinders at a cylinder load or a fuel injection amount sufficient to increase an exhaust temperature of the subset for burning unburned fuel and/or oil deposited in the subset and/or an exhaust system coupled thereto, while operating the engine in an overall low-load mode or an idle mode. During such operation, each successively operated subset of cylinders may include at least two cylinders at a time from the same cylinder bank. For example, each successively operated subset of cylinders may include exactly two cylinders at a time from the same cylinder bank. Cylinders that are not currently being operated in the subset are operated in a low- or no-fuel mode. The successive operation may include first operating a first subset of cylinders in the port heating mode, and then operating a different, second subset of cylinders in the port heating mode, and so on. Further, the distinct subsets may have cylinders in common, but each subset may be different from the others in terms of at least one cylinder. In some examples, such as when the engine is the non-EGR engine, the subsets may not be selected or distinguished based on whether the cylinders therein are donor or non-donor cylinders. In this way, it is possible to remove hydrocarbon deposits from exhaust of all of the cylinders.

In another example, the port heating may include operating the engine in at least two modes, including a first mode with a lower fuel injection amount, and a second mode with a higher fuel injection amount, the higher fuel injection amount being higher than the lower fuel injection amount. Specifically, the operation may include operating at least two of the cylinders of a cylinder bank (e.g., a right bank) in the second mode while at least another cylinder of an opposite cylinder bank (e.g., a left bank) operates in the first mode to increase the exhaust temperature at least of the at least two cylinders in the second mode after a designated amount of low-load engine operation, and during the low-load engine operation. Thus, even though an overall engine load may be low, select cylinders may operate with a higher cylinder load to thereby generate sufficient exhaust port temperatures to remove deposits, at least for that select cylinder. By changing which cylinders operate in each mode, different cylinders may have their respective exhaust systems cleaned of deposits. Such operation may continue until all cylinders have been operated with port heating, or until the engine load is increased away from idle or low-load operation (e.g., due to traveling conditions of the vehicle). In such cases, if the engine operates at sufficiently higher load, the port heating may be discontinued (e.g., any cylinders that had not yet been operated in the second mode would have been cleaned by the higher load operation, and thus it may be unnecessary to resume the port heating). However, if the load conditions were not sufficiently high, or were performed for too short of a duration, the port heating may resume where it left off.

Examples of the above operation, along with variations and additional operations are described with reference to the routine of FIG. 3. At step 302, the routine may include starting (but not yet incrementing) an idle timer, where an initial setting of time zero is indicated. The idle timer may measure an amount of time spent by the engine in idling conditions. In one example, the idling conditions may include the vehicle parked on a siding for a relatively long duration with the engine running at an idling speed. In some examples, a load timer may also be started (but not yet incremented) at step 302, where an initial setting of to time zero is indicated. The load timer may measure an amount of time during which the engine is loaded, e.g., not idling. At step 304, the routine may include incrementing the idle timer based on the amount of time spent in idle mode. At step 306, the routine may include determining whether the amount of time spent in idle mode is greater than a predetermined or specified maximum idle time. In one example, the predetermined maximum idle time may be 6 hours. In another example, the predetermined maximum idle time may be 60 min or less. Additionally or alternatively, the predetermined maximum idle time may be a function of the engine speed. For example, the predetermined maximum idle time may be decreased with increasing engine speed (e.g., the predetermined maximum idle time may be decreased from 60 min at 500 rpm to 0 min at 1200 rpm). If the amount of time spent in idle mode is greater than the predetermined maximum idle time, the routine may proceed to step 308, where the routine may include conditioning the engine for port heating. Note that the idle time may be a continuous idle time (e.g., without interruptions of other operating modes) or may include a plurality of idle conditions which together reach the predetermined maximum idle time.

While the depicted example uses fulfillment of idle timer criteria for enabling port heating, in alternate embodiments, other criteria may be used in addition to the idle timer criteria. As one example, an engine idling speed may be determined and if the engine idling speed is above a predetermined port heating speed limit, then the port heating operation may be disabled. As elaborated further in FIG. 4, a conditioning procedure may include identifying a first target cylinder where port heating may be initiated and an order of cylinders to follow. Further, the conditioning procedure may entail determining injection settings, slew rates, and port heating speeds. Once the engine has been appropriately conditioned, the routine may include running a port heating operation at step 310. Alternatively, if the routine is being restarted after a previously interrupted port heating operation, then at step 310 the port heating operation may be resumed.

Following running (or resumption) of the port heating operation, at step 312, the routine may include determining whether the engine is in idle mode (e.g., meeting one or more idle conditions). If the engine is idling, the routine may proceed to step 314, where the routine may include determining whether the port heating operation has been completed or not. If the port heating operation has been completed, the routine may include stopping further port heating at step 316 and resetting the idle timer to zero at step 318. However, if at step 312 it is determined that the engine is not idling (e.g., it is determined that the engine is operating at a higher load condition), the routine may include suspending port heating at step 320. The routine may proceed to step 322, where the routine may include determining if one or more engine load conditions meets load timer criteria, as further elaborated below.

As such, unburned oil and/or fuel accumulation may occur during prolonged engine idling conditions. However, during engine operation at non-idling conditions, an engine exhaust manifold may incur temperature rises which may spontaneously burn off the accumulated unburned oil and/or fuel. Thus, during engine operation at non-idling conditions, the port heating operation may be suspended or may not be executed at all. In this way, the routine may adjust a port heating operation to occur when the engine is idling for a sufficient duration, e.g., when a possibility of unburned oil accumulation is higher. Correspondingly, the routine may suspend the port heating operation when the engine is running at higher loads and thus when the unburned oil may be burned off during a normal course of the engine's operation. While operation at higher load is one example, various operations may trigger suspension of the port heating mode (e.g., an operator throttle request, cold ambient temperatures, engagement of an auxiliary load, etc.).

Returning to step 306, if the amount of time spent in idle mode is not greater than the predetermined maximum idle time, the routine may proceed to step 322, the routine may include determining if the engine has been loaded for a minimum load time (e.g., whether a minimum load timer duration has been met). As discussed above, upon suspension of port heating operations of a loaded engine at step 320, the routine may similarly determine whether the minimum load time has been reached at step 322. If the engine has been loaded for at least the minimum load time, then further port heating may not be requested in anticipation of exhaust temperature rises sufficient to burn off the accumulated unburned oil and/or fuel. Accordingly, if the minimum load time has been reached, the routine may proceed to step 323, port heating may not ensue and the routine may include resetting the idle timer to zero.

However, if neither the maximum idling time is met at step 306, nor the minimum load time is met at step 322, the routine may proceed to step 324, where the routine may include determining if the engine is still in idle mode. If the engine is still idling, the routine may return to step 304 to continue incrementing the idle timer and thereafter proceed with the port heating operation when/if the idling time criteria is met. If the engine is not idling at step 324, the routine may proceed to step 325, where the routine may determine if resumption of idling is requested (e.g., the minimum load time may not be reached and yet resumption of idling may be requested). If resumption of idling is requested, the routine may return to step 304 as described above. If resumption of idling is not requested, the routine may proceed to step 326, where the routine may include incrementing the load timer (e.g., instead of the idle timer). At step 328, the routine may include verifying whether a port heating operation had been suspended on a previous iteration of the routine. If the port heating operation had been previously suspended, the routine may proceed to step 330, where the routine may include resuming the port heating operation. If a previous iteration of the port heating operation had not been interrupted, the routine may return to step 322, where the routine may continue determining whether the minimum load time has been reached and, at step 326, incrementing the load timer until the minimum load time is reached (following which the need for the port heating operation may be negated and consequently the idle timer may be reset to zero).

As such, at least two criteria may be considered in the determination of whether or not to proceed with a port heating operation. The at least two criteria may include a time spent in an idling mode (as may be defined by an idle timer) and an engine load condition (as may be defined by a load timer and/or a loaded or non-idle condition of the engine). However, in certain examples, even if the accumulation of unburned oil and/or fuel would present a potential issue during idle or low engine load conditions, the temperature of the exhaust manifold may be raised enough to allow the accumulated unburned fuel and/or oil to be burned during operation of the engine in a sufficiently loaded condition of sufficient duration.

In one example scenario, the engine may be in an idling condition and may have spent enough time in the idling condition to warrant a port heating operation to avert adverse effects of accumulated unburned oil. In this scenario, where an idle timer criterion is met, the port heating operation may ensue. Upon completion of the port heating operation, the idle timer may be reset to allow a new, subsequent iteration of the port heating operation to follow at a later time (e.g., following a duration with no port heating). In another example, the engine may not be idling, and may instead be loaded. In such an example, the engine may have spent enough time in the loaded condition to fulfill a load timer criterion and ensure high exhaust manifold temperatures such that a port heating operation may not be requested. Moreover, as long as the engine maintains operation in non-idling conditions, and the load timer criterion is met, the idle timer may remain at zero.

In yet another example, the engine may be idling, but not yet for long enough to fulfill the idle timer criterion. Further, the idling condition of the engine may be interrupted by a sudden operation of the engine in a loaded condition. If the interrupting operation of the engine in the loaded condition continues long enough to fulfill the load timer criterion, then the exhaust manifold temperatures may again be expected to reach desirable high temperatures to allow the unburned oil to be burned off, such that upon returning to the idling condition, a port heating operation may not be requested, and the idle timer may be reset to zero. However, if the interrupting operation of the engine in the loaded condition is not long enough to fulfill the load timer criterion, then upon completion of the loaded engine operation, the engine may return to the idling condition and resume determination of idle timing.

In still another example, the engine may have idled long enough to fulfill the idle timer criterion and proceeded to run a port heating operation. However, the port heating operation may be interrupted by a sudden operation of the engine in a loaded condition. First, the idle condition interrupting running of the engine may result in the port heating operation being suspended. Further, if the engine is run long enough to fulfill the load timer criterion, unburned oil and/or fuel may be purged and thus the port heating operation may be aborted/abandoned and the idle timer may be returned to zero in anticipation of a new iteration of the port heating operation. However, if the engine is run only for a shorter amount of time (e.g., not enough to fulfill the load timer criterion) and then returned to the idling condition, the port heating operation may be resumed in anticipation of accumulation and subsequent purging of the unburned oil and/or fuel. In this way, a control system may be configured to anticipate accumulation, purging, and/or burning of unburned oil in an engine exhaust manifold based on the amount of time spent by the engine in idling conditions vis-à-vis running (or loaded) conditions. Accordingly, by judiciously adjusting a port heating operation, potential issues related to unburned oil buildup may be averted. Further details of a (pre)conditioning procedure, as well as a running/resumption of the port heating operation, are elaborated below in the context of FIG. 4.

Figure 4:
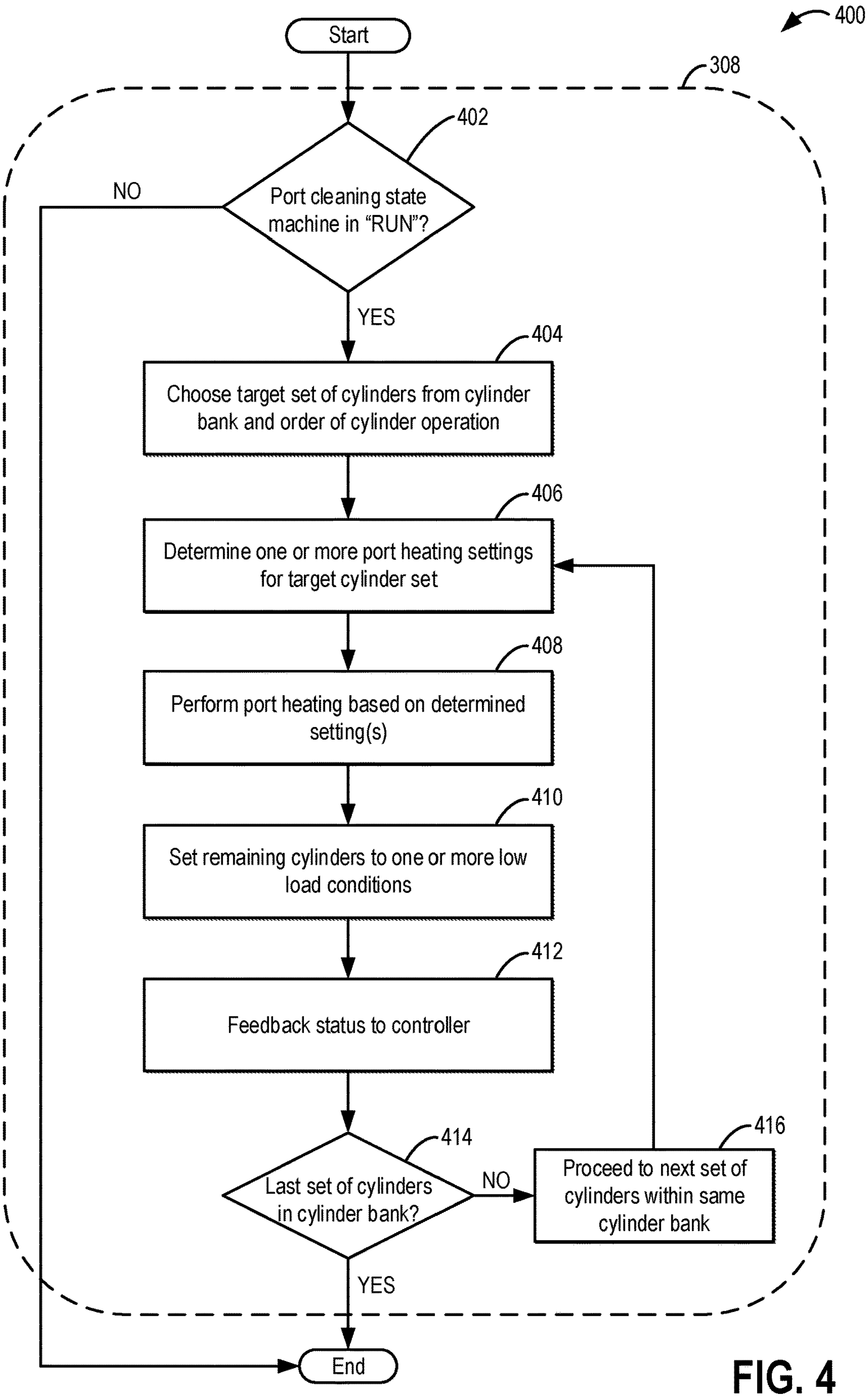
FIG. 4 shows a high level flow chart for a conditioning routine which may be performed to prepare an engine for an ensuing port heating operation, according to an embodiment of the disclosure.

FIG. 4 depicts an example routine 400 that may be performed by a control system to condition an engine, such as a non-EGR engine and/or a high speed diesel engine, for a subsequent running (or resumption) of a port heating operation. As such, the routine may be performed as part of, or may wholly substitute, the conditioning step (step 308) of routine 300, as described in detail above with reference to FIG. 3. The routine may determine an order of cylinders to be purged of their unburned oil buildup. Further, the routine may allow port heating to be adjusted responsive to an engine age, an engine speed, and a souping level if the engine. At step 402, the routine may include determining whether a port heating state machine is in a "RUN" mode (as opposed to a "HOLD" mode). The routine may continue (to step 404; see below) if the "RUN" mode has been selected, which in turn may depend upon each of one or more port heating operation criteria being met. If the port heating state machine is not in the run mode (e.g., is in the "HOLD" mode), the routine may end (e.g., continue to step 310 as described in detail above with reference to FIG. 3).

At step 404, the routine may include selecting a target set of cylinders from a cylinder bank for initiating cylinder purging (e.g., the port heating operation). Further, a subsequent order of cylinder purging operation may be determined. For example, based on various engine configurations, the engine may be divided into heating and non-heating ports (e.g., based on cylinder banks). In one example, the engine may be a V-12 engine with two banks of six inline cylinders having a log-type exhaust manifold for each bank. The target set of cylinders may be selected from a first bank (e.g., a right bank) with the cylinders in a second bank (e.g., a left bank) including the non-heating ports. In this configuration, an order of port heating may include starting with the target set of cylinders in a designated bank and successively port heating remaining sets of cylinders within the same bank. Further, the (target) cylinder sets may be selected to take advantage of previously heated neighboring cylinders so that the cylinder that may have the greatest accumulation of exhaust hydrocarbons may experience a longest duration of high temperature exhaust. In some examples, port heating may be operated within an entire bank as opposed to cylinder sets within the bank, which may demand the non-heating bank to receive normal fueling. In some examples, such as when the engine is the non-EGR engine, the target cylinder sets may not be selected or distinguished based on whether the cylinders therein are donor or non-donor cylinders.

At step 406, the routine may include determining one or more port heating settings for the target cylinder set. The one or more port heating settings may be determined based on at least one of an engine speed, an engine age (e.g., accumulated MWh), a (calculated or measured) souping level of the engine, and an idle time. As an example, an operating aspect (e.g., duration, temperature, amount of over-fueling, etc.) of the port heating may be decreased based at least in part on the souping level of the engine, thereby reducing an associated fuel consumption penalty over time. As another example, a target temperature and/or a duration of port heating may be determined based on current engine demand for established speed, RP, and/or AA ranges or ratios. For instance, in such an example, a first set of port heating settings may be determined for high speed engine conditions (e.g., corresponding to a higher engine speed), a second set of port heating settings may be determined for medium speed engine conditions (e.g., corresponding to an intermediate engine speed lower than the higher engine speed), and/or a third set of port heating settings may be determined for low speed or idle engine conditions (e.g., corresponding to a lower engine speed lower than each of the higher and intermediate engine speeds).

In one example, the high speed engine conditions may include an engine speed ranging from 1200 to 1800 rpm, an AA ranging from 17 to 24 degrees, and/or an RP ranging from 800 to 1000 bar. The medium speed engine conditions may include an engine speed ranging from 600 to 1200 rpm, an AA ranging from 5 to 17 degrees, and/or an RP ranging from 600 to 800 bar. The low speed or idle engine conditions may include an engine speed ranging below 600 rpm, an AA ranging below 5 degrees, and/or an RP ranging below 600 bar. Alternatively, the one or more port heating settings may be varied based on different engine speed, MWh, RP, and/or AA ratios (e.g., the target temperature or the duration of port heating may increase by a specified amount for a specified speed increase relative to the engine age in MWh). For example, the duration and the target temperature of port heating may be decreased at the higher speed conditions as compared to that during the lower speed or (idling) or medium speed conditions. In an additional or alternative example, during the high speed engine conditions, the engine may be controlled to drop to an rpm level below "high speed" as part of the port heating settings. During the medium or low speed (or idling) engine conditions, the settings for port heating may not include shifting rpm levels.

In one example, the one or more port heating conditions may be variable above a high speed threshold based on the engine age (e.g., in MWh) and/or a function of time whereas under the high speed threshold the one or more port heating conditions may be fixed. For example, at or above 1200 rpm, the target temperature of the port heating, the duration of the port heating, a frequency of port heating (e.g., of individual port heating events), and/or an amount of fuel used by at least one cylinder during the port heating may be varied. For speeds below 1200 rpm, the target temperature of the port heating, the duration of the port heating, the frequency of the port heating, and/or the amount of fuel used by the at least one cylinder during the port heating may be set at fixed values, the fixed values independent of the engine age and/or the function of time. In one example, the duration of the port heating may be fixed at 18 min for every 60 min of operation for all speeds under 1200 rpm whereas the duration of port heating may vary based on time of operation and/or other factors for engine speeds at or above 1200 rpm.

In another example, the duration of the port heating may be fixed at 18 min for all speeds under 1200 rpm, interrupted by idle times of 60 min or less. In some examples, and as described in greater detail below with reference to FIG. 7, the idle time (between port heating events) may depend upon the engine speed. For example, at 500 rpm, the duration of the port heating may be 18 min and the idle time may be 60 min. Above 1200 rpm, port heating may not be operated on a cyclic basis and may instead be operated on a continuous basis (e.g., without interruptions or excursions into idling or other modes). In such examples, and as described in greater detail below with reference to FIG. 8, the port heating may only be run at low-load or idling conditions of the engine according to an engine-speed dependent maximum power limit. In one example, upon requesting idling, the engine may idle for the idle time prior to running port heating.

The controller may operate to adjust (e.g., decrease) an operating aspect of the port heating mode or event based at least in part on the calculated or measured level of souping of the engine. In one example, the level of souping of the engine may be calculated by subtracting emissions during a soup test baseline from emissions during a soup test, and then dividing by a number of minutes of idle operation between the soup test baseline and the soup test. The calculated amount of souping may be used to adjust the operating aspect of the port heating to increase efficiency/decrease variation of cleaning as well as reduce the fuel consumption penalty associated with the port heating over time. For example, the target temperature and the duration of the port heating for each of a plurality of threshold-defined ranges (e.g., engine speed ranges) may be decreased at lower levels of souping of the engine (e.g., as the engine is broken in).

In one example, the port heating mode or event may include over-fueling a set of cylinders within the bank of cylinders undergoing the port heating (e.g., via actuating a fuel injector of at least two cylinders to increase the amount of fuel injected into the cylinders). An amount of over-fueling (e.g., an amount of additional fuel injected) may be based on initial port heating settings and further adjusted to account for one or more of the engine age, the souping level of the engine, fuel injector health, fuel injector wear, one or more ambient conditions (e.g., of an external environment, such as ambient temperature, altitude, ambient humidity, etc.), time since last engine overhaul, and the like. Once the port heating settings have been determined/established, they may be communicated to the target cylinder set and, at step 408, the routine may include performing the port heating in the target cylinder set based on the determined port heating settings. At step 410, the routine may include setting remaining cylinders (that is, cylinders not part of the target cylinder set selected at step 404) to low cylinder load conditions. Accordingly, in some examples, steps 408 and 410 may be performed simultaneously. At step 412, the routine may include feeding a status update back to a controller upon completion of the port heating in the target cylinder set. At step 414, the routine may include determining whether the target cylinder set is a last target cylinder set within the same cylinder bank. If the target cylinder set is the last target cylinder set, the routine may end (e.g., continue to step 310 as described in detail above with reference to FIG. 3). If the target cylinder is not the last target cylinder set, the routine may proceed to step 416, where the routine may include proceeding to a next target cylinder set within the same cylinder bank in the order determined previously at step 404. The routine may return to 406 to determine the one or more port heating settings for the next target cylinder set and perform the port heating thereon (at 408).

In another example, the controller may determine one or more of accumulated engine revolutions at low or no load, the load amount, and engine revolutions as a function of MWh as factor(s) in determining whether to initiate the port heating. The engine speed, the engine load, MWh, and time may further be taken into account so that differential port heating may be engaged at multiple speeds (e.g., different speed levels may trigger different levels of port heating). In one embodiment, idle timer criteria may be used to determine if the one or more port heating conditions have been met. The idle timer criteria may be based on different engine speeds [e.g., a first speed, a second speed, a third speed (high speed, medium speed, low speed), etc.] as well as different engine ages and normalized to an engine revolution count (e.g., by using a 2D table of multipliers determined as a function of the engine speed and the engine age in MWh). A normalized engine revolution counter limit may be used as a threshold counter to enable port heating. In one embodiment, normalized engine revolution counter limit may be expressed as a 1D vector (e.g., as a function of the engine age in MWh).

FIGS. 5 and 6 show non-limiting examples of the AA and the RP, respectively, at different engine speeds during port heating using the routines presented in FIGS. 3 and 4 as compared to the AA and the RP, respectively, at different speeds during normal engine operation. As shown in a graph 500 of FIG. 5, the AA may be decreased during port heating events (curve 502) relative to normal engine operation (curve 504) at lower engine speeds (e.g., ranging from 500 to 1750 rpm). Similarly, as shown in a graph 600 of FIG. 6, the RP may be decreased during port heating events (curve 602) relative to normal engine operation (curve 604) at lower engine speeds (e.g., ranging from 500 to 1500 rpm). Conversely, in certain examples at higher engine speeds (e.g., above 1500 rpm), the RP and AA may be the same as during normal engine operation.

Figure 7:
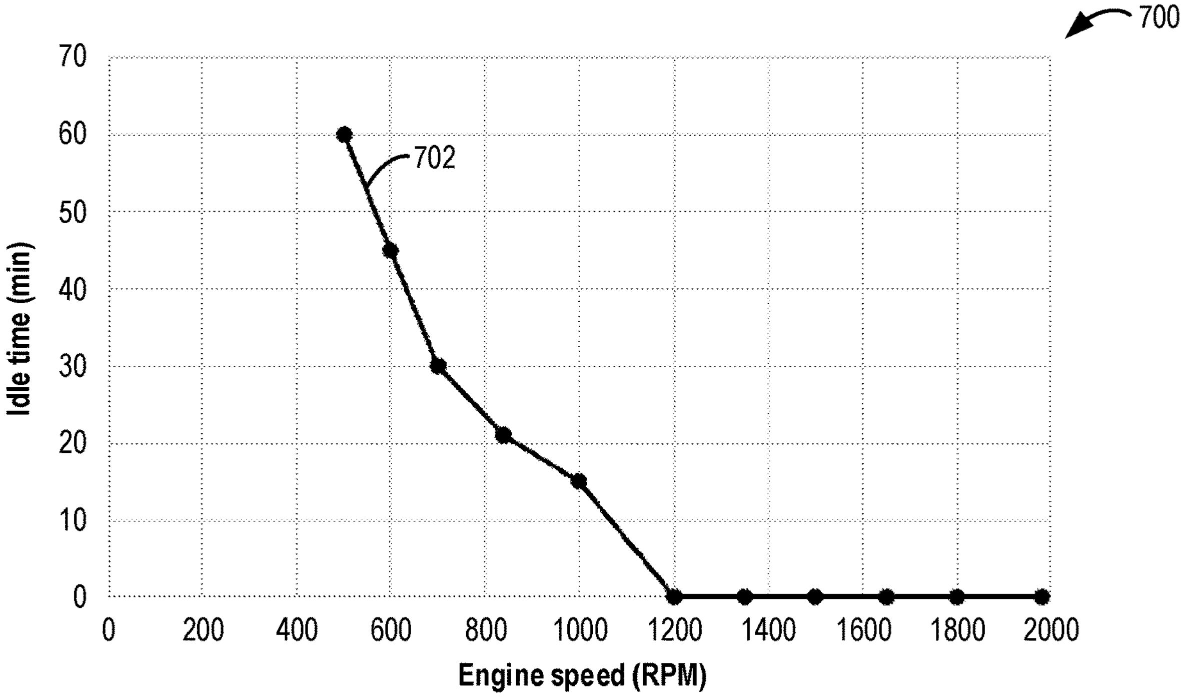
FIG. 7 shows a non-limiting example of graphical data illustrating an idle time between port heating events using the routines presented in FIGS. 3 and 4.
Figure 8:
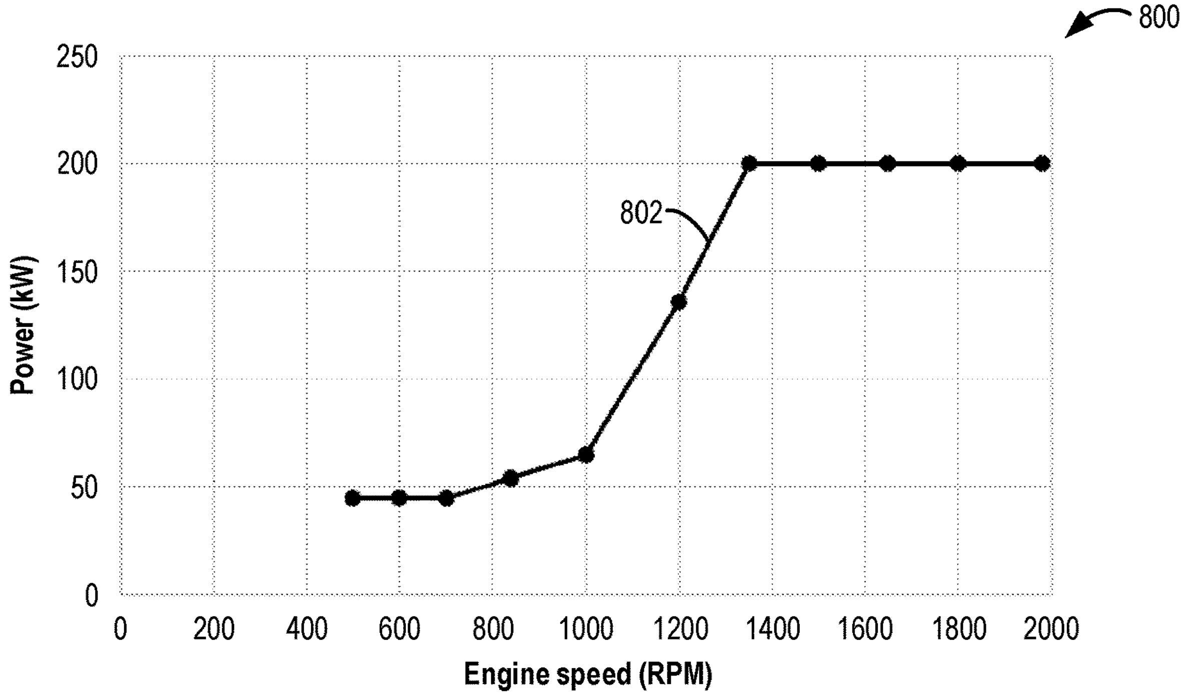
FIG. 8 shows a non-limiting example of graphical data illustrating a maximum power limit for running port heating using the routines presented in FIGS. 3 and 4.

FIGS. 7 and 8 show non-limiting examples of the idle time between port heating events and the maximum power limit for running the port heating events, respectively, at different engine speeds. The port heating events may be run using the routines presented in FIGS. 3 and 4. As shown in a graph 700 of FIG. 7, the idle time between the port heating events may be decreased as the engine speed increases (curve 702), e.g., up to a first threshold engine speed. Accordingly, a ratio between the idle time and the duration of each port heating event may decrease as the engine speed increases up to the first threshold speed. Specifically, at engine speeds between 500 rpm and 1200 rpm, the idle time may decrease from 60 min to 0 min, while a duration of each port heating event may remain fixed (e.g., at 18 min). At and above 1200 rpm (e.g., the first threshold engine speed), the idle time may be 0 min, such that port heating may be run continuously (e.g., without interruptions or excursions into idling or other modes). However, the port heating events may only be run at engine loads less than the maximum power limit. As shown in a graph 800 of FIG. 8, the maximum power limit may be increased as the engine speed increases (curve 802), e.g., up to a second threshold engine speed. Specifically, at engine speeds between 500 rpm and 1350 rpm, the maximum power limit may increase from 45 kW to 200 kW. At and above 1350 rpm (e.g., the second threshold engine speed), the maximum power limit may be 200 kW.

Methods and systems for port heating may be provided to reduce unburned oil and/or fuel accumulations, e.g., during low-load and/or idle engine operation. In some examples, cylinder exhaust ports of an engine may be sequentially and periodically heated to allow unburned oil therewithin to be evaporated and/or combusted. This may reduce or eliminate undesirable buildup of fuel and/or oil in the cylinder exhaust ports and an exhaust stack downstream. By adjusting port heating operation responsive to an amount of time spent by the engine in an idling condition and further based on an engine load condition, an engine age, and a souping level of the engine, exhaust maintenance may be partially or fully automated and human intervention may be reduced.

As used herein, an element or step recited in the singular and preceded with the word "a" or "an" should be understood as not excluding plural of said elements or steps, unless such exclusion is explicitly stated. Furthermore, references to "one embodiment" or "one example" of the invention do not exclude the existence of additional embodiments or examples that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

The control methods and routines disclosed herein may be stored as executable instructions in non-transitory memory and may be carried out by the control system (e.g., the controller) in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:

a non-EGR high speed diesel engine having sets of cylinders, each cylinder having at least one port; and a controller with instructions stored in memory and configured for:

determining one or more operating conditions of the engine;

determining a load of the engine;

determining if one or more conditions have been met for port heating based on the one or more operating conditions of the engine and the load of the engine;

continuing current operation if the one or more conditions for port heating have not been met; and determining a souping level of the engine if the one or more conditions for port heating have been met and subsequently running port heating on a selected set of the sets of cylinders based on the souping level of the engine and the one or more conditions for port heating, wherein the one or more conditions for port heating comprises an idle time elapsing, and wherein running port heating on the selected set of the sets of cylinders includes decreasing a duration, temperature, or amount of over-fueling of the port heating based at least in part on the souping level of the engine, and further including decreasing, during the port heating, one or more of a frequency of port heating events and a duration of each port heating event based an increased engine age.

2. The system of claim 1, wherein the idle time decreases as a speed of the engine increases up to a first threshold speed, and wherein the idle time is zero when the speed of the engine is at and above the first threshold speed, and wherein the instructions further initiate port heating without EGR cooler regeneration, where the port heating is graduated out over time and port heating is weighted by the engine age and the souping level.

3. The system of claim 2, wherein the first threshold speed is 1200 rpm.

4. The system of claim 2, wherein running port heating on the selected set of cylinders comprises:

running port heating between iterations of the idle time elapsing when the speed of the engine is below the first threshold speed; and running port heating without interruption when the speed of the engine is at or above the first threshold speed.

5. The system of claim 4, wherein a ratio of the idle time and a duration of port heating between iterations of the idle time elapsing decreases as the speed of the engine increases up to the first threshold speed.

6. The system of claim 2, wherein the one or more conditions for port heating further comprises an engine load being less than a maximum power limit.

7. The system of claim 6, wherein the maximum power limit increases as the speed of the engine increases up to a second threshold speed, and wherein the maximum power limit is constant when the speed of the engine is at or above the second threshold speed.

8. The system of claim 7, wherein the second threshold speed is 1350 rpm.

9. The method system of claim 1, further comprising determining the idle time based on a speed of the engine and an age of the engine, and normalizing the idle time to an engine revolution count.

10. The system of claim 1, further comprising, if the one or more conditions for port heating have been met:

determining a first set of port heating settings for high speed engine conditions, the high speed engine conditions comprising a speed of the engine ranging from 1200 to 1800 rpm, an advance angle ranging from 17 to 24 degrees, and a rail pressure ranging from 800 to 1000 bar;

determining a second set of port heating settings for medium speed engine conditions, the medium speed engine conditions comprising the speed of the engine ranging from 600 to 1200 rpm, the advance angle ranging from 5 to 17 degrees, and the rail pressure ranging from 600 to 800 bar; and determining a third set of port heating settings for low speed or idle engine conditions, the low speed or idle engine conditions comprising the speed of the engine ranging below 600 rpm, the advance angle ranging below 5 degrees, and the rail pressure ranging below 600 bar.

11. A system, comprising:

a non-EGR high speed diesel engine having cylinders in banks, each cylinder having at least one port; and a controller that is configured to operate the engine in at least two modes, with at least one of the at least two modes being a port heating mode, and the controller is further configured to reduce a fuel consumption penalty of the port heating mode by decreasing an operating aspect of the port heating mode based at least in part on a calculated or measured level of souping of the engine and further based on an increased engine age.

12. The system of claim 11, wherein decreasing the operating aspect comprises decreasing at least one of a frequency of port heating events, a duration of each port heating event, a target temperature of each port heating event, and an amount of fuel used by at least one of the cylinders during each port heating event when the engine operates at or above a set high speed threshold.

13. The system of claim 12, wherein the operating aspect of the port heating mode is fixed for speeds below the set high speed threshold.

14. The system of claim 12, wherein the set high speed threshold is 1200 rpm.

15. A system, comprising:

a high speed non-EGR diesel engine having cylinders in banks, at least one of the cylinders having at least one port; and a controller including instructions stored in memory and configured to operate the engine in at least two modes, with at least one of the at least two modes being a port heating mode, the controller being further configured with instructions to decrease, for the port heating mode, one or more of a frequency of port heating events and a duration of each port heating event based on an age of the engine, including as the age of the engine increases.

16. The system of claim 15, wherein a subset of at least two cylinders within a first bank operate in the port heating mode and remaining cylinders of the engine operate in a non-port heating mode.

17. The system of claim 16, wherein the controller is further configured to resume the port heating mode by successively operating subsets of at least two cylinders in the port heating mode until all cylinders within the first bank have been operated in the port heating mode at least once.

18. The system of claim 15, wherein the age of the engine is a calculated or measured megawatt-hours of the engine.

19. The system of claim 15, wherein the engine is operating in a locomotive.

* * * * *